(12) United States Patent
Miyazaki et al.

(10) Patent No.: US 11,356,037 B2
(45) Date of Patent: Jun. 7, 2022

(54) INVERTER CONTROL DEVICE, INVERTER CONTROL METHOD, INVERTER CONTROL PROGRAM

(71) Applicant: HITACHI AUTOMOTIVE SYSTEMS, LTD., Hitachinaka (JP)

(72) Inventors: Taizou Miyazaki, Tokyo (JP); Toshiyuki Ajima, Tokyo (JP); Toshisada Mitsui, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/047,463

(22) PCT Filed: Mar. 12, 2019

(86) PCT No.: PCT/JP2019/009875
§ 371 (c)(1),
(2) Date: Oct. 14, 2020

(87) PCT Pub. No.: WO2019/202876
PCT Pub. Date: Oct. 24, 2019

(65) Prior Publication Data
US 2021/0119553 A1    Apr. 22, 2021

(30) Foreign Application Priority Data

Apr. 17, 2018    (JP) .............................. JP2018-079041

(51) Int. Cl.
*H02M 7/538* (2007.01)
(52) U.S. Cl.
CPC .............................. *H02M 7/53803* (2013.01)
(58) Field of Classification Search
CPC .. H02M 7/53803; H02M 7/537; H02M 7/529; H02M 7/527; H02M 7/525; H02M 7/44; H02M 7/4803
See application file for complete search history.

(56) References Cited

U.S. PATENT DOCUMENTS

| | | | |
|---|---|---|---|
| 7,759,888 B2 * | 7/2010 | Matsui | H02H 7/0805 318/400.29 |
| 2004/0131114 A1 * | 7/2004 | Ishida | H02M 7/53871 375/238 |

(Continued)

FOREIGN PATENT DOCUMENTS

| | | |
|---|---|---|
| JP | 2001-197725 A | 7/2001 |
| JP | 2017-060341 A | 3/2017 |
| WO | WO-2017/145640 A1 | 8/2017 |

OTHER PUBLICATIONS

International Search Report with English translation and Written Opinion issued in corresponding application No. PCT/JP2019/009875 dated Jun. 4, 2019.

*Primary Examiner* — Nguyen Tran
(74) *Attorney, Agent, or Firm* — Foley & Lardner LLP

(57) ABSTRACT

To improve control characteristics of an inverter while suppressing manufacturing cost. An inverter control device 10 is a device for controlling an inverter device 1 having a plurality of switching elements. The inverter control device 10 includes a current control unit 13 that calculates three phase voltage command signals Vu*, Vv*, and Vw* based on a d-axis current command signal id* and a q-axis current command signal iq* at each predetermined calculation period T0, a sampling period conversion unit 14 that outputs three phase voltage command signals Vu, Vv, and Vw** after update at each predetermined update period T1 different from the calculation period T0 based on a calculation result of the three phase voltage command signals Vu*, Vv*, and Vw* by the current control unit 13, and a gate signal generation unit 15 that generates a gate signal for switching-driving a plurality of the switching elements based on the three phase voltage command signals Vu, Vv, and Vw after update output from the sampling period conversion unit 14**.

5 Claims, 8 Drawing Sheets

(56) References Cited

U.S. PATENT DOCUMENTS

2011/0292700 A1\* 12/2011 Arakawa .......... H02M 7/53871
363/95
2019/0047614 A1 2/2019 Kashima \* cited by examiner

FIG. 3
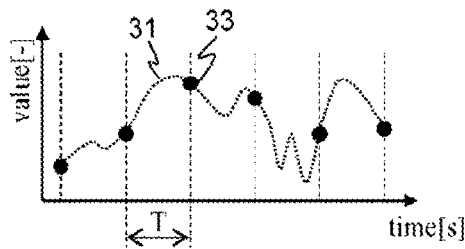
(a) IMPULSE TRAIN 33
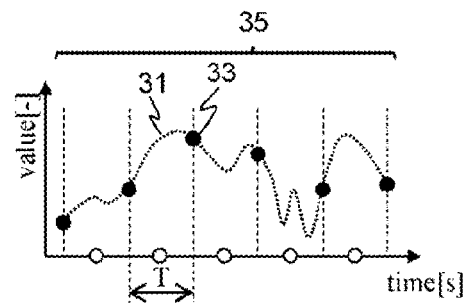
(b) ZERO-ADDED IMPULSE TRAIN 35
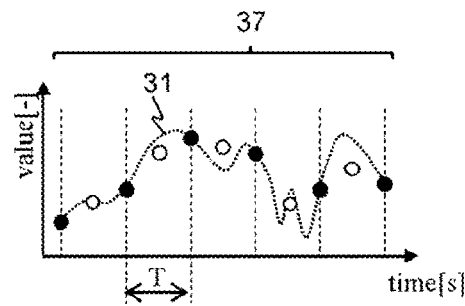
(c) UPSAMPLED SIGNAL 37

FIG. 8
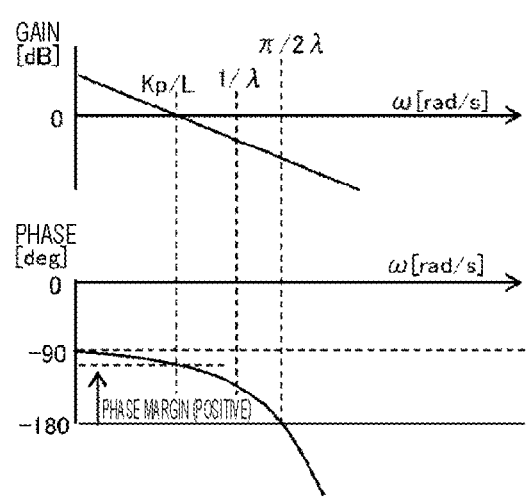
(a) STABLE
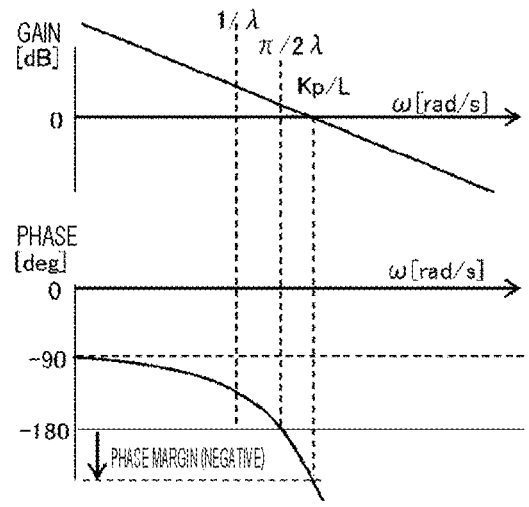
(b) UNSTABLE

INVERTER CONTROL DEVICE, INVERTER CONTROL METHOD, INVERTER CONTROL PROGRAM

TECHNICAL FIELD

The present invention relates to an inverter control device, an inverter control method, and an inverter control program used for controlling an inverter.

BACKGROUND ART

Regarding the improvement of control characteristics in the control of an inverter, the technique described in Patent Literature 1 below is known. Patent Literature 1 discloses a control device of an open winding system, the control device including a first inverter having three phases of two switching devices connected in series, and a second inverter having three phases of two switching devices connected in series. A winding for each phase is provided between a neutral point of the two switching devices for each phase of the first inverter and a neutral point of the two switching devices for each phase of the second inverter. The control device includes an FCC unit that calculates a current command value and a slip command value based on a torque command value and a magnetic flux command value, a current control unit that calculates a voltage command value based on a current detection value, an angular velocity detection value, a current command value, and a slip command value, a command value conversion unit that generates a voltage command value for the first inverter and a voltage command value for the second inverter based on the voltage command value, a first comparator for generating a gate signal of the first inverter by comparing the voltage command value for the first inverter and a carrier signal, and a second comparator for generating a gate signal of the second inverter by comparing the voltage command value for the second inverter and the carrier signal. The current control unit includes a current predicting unit that calculates a current prediction value based on a current detection value, a load voltage estimation value, and a voltage command value at a peak of the carrier signal, and calculates a current prediction value based on a previous current prediction value and a load voltage estimation value, and a voltage command value at a midpoint of the carrier signal, a load voltage estimation unit that calculates a load voltage estimation value based on a rotor magnetic flux estimation value or a magnetic flux command value, an angular velocity detection value, and a current prediction value, and a voltage command value calculation unit that calculates a voltage command value based on a current command value that is one sampling ahead, a current prediction value, and a load voltage estimation value. The voltage command value is updated at ¼ period of the carrier frequency.

CITATION LIST

Patent Literature

PTL 1: JP 2017-60341 A

SUMMARY OF INVENTION

Technical Problem

In the control device described in Patent Literature 1, in order to update the voltage command value at ¼ period of the carrier frequency, the current control unit needs to calculate the voltage command value at high speed. Therefore, it is necessary to realize the current control unit using a high-performance microcomputer capable of high-speed calculation, which leads to an increase in manufacturing cost.

Solution to Problem

An inverter control device according to the present invention is a device for controlling an inverter having a plurality of switching elements. The inverter control device includes a current control unit that calculates a voltage command based on a current command at each predetermined calculation period, a sampling period conversion unit that outputs a voltage command signal at each predetermined update period different from the calculation period based on a calculation result of the voltage command by the current control unit, and a gate signal generation unit that generates a gate signal for switching-driving a plurality of the switching elements based on the voltage command signal output from the sampling period conversion unit.

An inverter control method according to the present invention is a method of controlling an inverter having a plurality of switching elements. The inverter control method includes calculating a voltage command based on a current command at each predetermined calculation period by a computer, and outputting a voltage command signal at each predetermined update period different from the calculation period based on a calculation result of the voltage command by the computer, and generating a gate signal for switching-driving a plurality of the switching elements based on the voltage command signal output from the computer.

An inverter control program according to the present invention is a program executable by a computer. The inverter control program causes, for controlling an inverter having a plurality of switching elements, the computer to function as a current control unit that calculates a voltage command based on a current command at each predetermined calculation period, and a sampling period conversion unit that outputs a voltage command signal for generating a gate signal for switching-driving a plurality of the switching elements at each predetermined update period different from the calculation period based on a calculation result of the voltage command by the current control unit.

Advantageous Effects of Invention

According to the present invention, it is possible to improve control characteristics of an inverter while suppressing manufacturing cost.

BRIEF DESCRIPTION OF DRAWINGS

FIG. 3 is a diagram explaining output of each element in the sampling period conversion unit.

FIG. 8 is a diagram showing an example of a Bode plot of the current control system.

DESCRIPTION OF EMBODIMENTS

Hereinafter, an embodiment of the present invention will be described with reference to the drawings.

Figure 1:
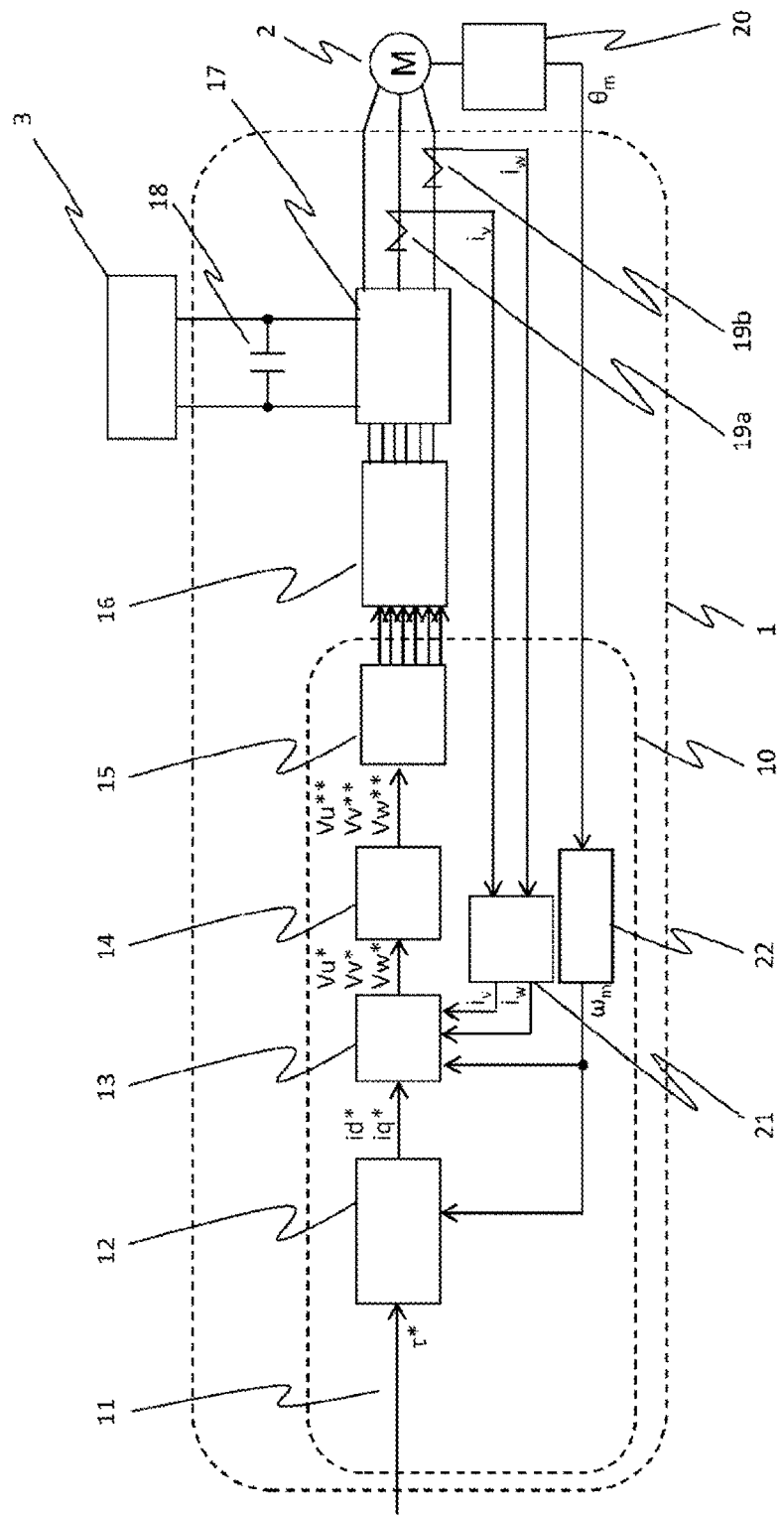
FIG. 1 is a configuration diagram of an inverter device including an inverter control device according to an embodiment of the present invention.

FIG. 1 is a configuration diagram of an inverter device 1 including an inverter control device 10 according to an embodiment of the present invention. The inverter device 1 shown in FIG. 1 is connected to a motor 2 and a DC power supply 3, and includes the inverter control device 10, a gate driver 16, a three phase bridge circuit 17, a smoothing capacitor 18, and current sensors 19a and 19b. The inverter device 1 converts DC power supplied from the DC power supply 3 into AC power based on a torque command 11 input from the outside, and sends the AC power to the motor 2. The motor 2 is an electric motor that receives AC power from the inverter device 1 and is driven to rotate. Specifically, an induction machine, a permanent magnet synchronous machine, a DC brushless motor, a synchronous reluctance motor, a switched reluctance motor, or the like is used as the motor 2. A rotation angle sensor 20 is attached to the motor 2, and a mechanical rotation angle θm of the motor 2 detected by the rotation angle sensor 20 is input to the inverter device 1.

First, a configuration of the inverter control device will be described. The inverter control device 10 includes functional blocks of a current command generation unit 12, a current control unit 13, a sampling period conversion unit 14, a gate signal generation unit 15, an A/D conversion unit 21, and a speed calculation unit 22. The inverter control device 10 can implement these functional blocks using predetermined program executed by a microcomputer, and hardware such as a field programmable gate array (FPGA) and a general-purpose logic IC. Note that, in general, inverter control requires other various functions such as power supply stabilization and temperature protection. However, in FIG. 1, functional elements are limited to those that constitute a current control system related to the present invention.

The current command generation unit 12 generates a current command signal according to desired torque $\tau^*$ represented by the torque command 11. In general, in motor control, for simplification of calculation, coordinates specific to a motor are set, and a control amount is calculated with respect to a current defined by the coordinate system. For example, in a case of an induction machine, a γ-δ coordinate system in which a field direction is defined as a γ axis and a direction orthogonal to the field direction is defined as a δ axis is generally used. Further, in a case of a synchronous machine, a d-q coordinate system in which a field direction of a permanent magnet is defined as a d axis and a direction orthogonal to the field direction is defined as a q axis is generally used. Hereinafter, a case in which the motor 2 is a permanent magnet embedded synchronous motor (IPM) and the inverter device 1 controls the motor 2 using the d-q coordinate system will be described as an example, which also similarly applies to other cases.

Note that a generation location of the torque command 11 is determined according to the application of the motor 2 that the inverter device 1 controls. For example, in a case where the motor 2 is a traveling motor for an electric vehicle, an in-vehicle controller provided outside the inverter device 1 generates the torque command 11 from the desired torque $\tau^*$ calculated based on an accelerator opening of the vehicle. Further, in a case where the motor 2 is a motor for general industries, the torque command 11 may be generated in a speed control system of the inverter device 1.

In the case of the d-q coordinate system, the current command generation unit 12 generates a d-axis current command signal id* and a q-axis current command signal iq* from the desired torque $\tau^*$ given by the torque command 11. At this time, the combination of the d-axis current and the q-axis current that generate the same torque cannot be uniquely determined. Further, the d-axis current and the q-axis current corresponding to the desired torque $\tau^*$ also change depending on the rotation speed of the motor 2. For this reason, the current command generation unit 12 usually determines the d-axis current command signal id* and the q-axis current command signal iq* corresponding to the desired torque $\tau^*$ under conditions set in advance. The conditions include, for example, that torque with respect to a current becomes maximum, efficiency becomes maximum, and the like.

Note that, calculating, in real time, the d-axis current command signal id* and the q-axis current command signal corresponding to the desired torque $\tau^*$ and the rotation speed of the motor 2 under the above conditions causes a large calculation load on the current command generation unit 12. For this reason, in general, the torque and the rotation speed of the motor 2 and the combination of the d-axis current and q-axis current corresponding to the torque and the rotation speed is calculated off-line in advance, and a result of the calculation is stored in the inverter control device 10 as a current command map in advance.

The current command generation unit 12 receives input of a current mechanical angular rotation speed ωm of the motor 2 output from the speed calculation unit 22 and the desired torque $\tau^*$ represented by the torque command 11, and determines the combination of the d-axis current and the q-axis current to be output to the motor 2 by a map search using the above current command map. Then, according to the determined combination of the d-axis current and the q-axis current, the d-axis current command signal id* and the q-axis current command signal iq* are generated and output to the current control unit 13.

The current control unit 13 calculates a voltage command based on a current command determined by the current command generation unit 12 in a manner corresponding to the desired torque $\tau^*$ at predetermined calculation periods. Specifically, the current control unit 13 calculates three phase voltage command signals Vu*, Vv*, and Vw* applied to the motor 2 based on the d-axis current command signal id* and the q-axis current command signal iq* input from the current command generation unit 12, and outputs the signals to the sampling period conversion unit 14. At this time, the current control unit 13 obtains an actual d-axis current id and an actual q-axis current iq based on a V-phase detection current iv and a W-phase detection current iw detected by the current sensors 19a and 19b and acquired by the A/D conversion unit 21, and calculates the d-axis voltage command and the q-axis voltage command so that a difference between the d-axis current command signal id* and the actual d-axis current id and a difference between the q-axis current command signal iq* and the actual q-axis current iq become zero.

Then, using an electric rotation angle θe of the motor 2, the current control unit 13 converts the d-axis voltage command and the q-axis voltage command into the three phase voltage command signals Vu*, Vv*, and Vw* by performing coordinate conversion from the d-q coordinate system to a three phase coordinate system that represents a three phase current and a three phase voltage that are the actual output to the motor 2. The current control unit 13 performs such calculation every predetermined calculation period T0, so as to be able to calculate the three phase voltage command signals Vu*, Vv*, and Vw* from the d-axis current command signal id* and the q-axis current command signal iq*.

In the current control unit 13, the electric rotation angle θe is obtained in a manner that an electric angular rotation speed ωe is obtained by multiplying the mechanical angular rotation speed ωm output from the speed calculation unit 22 by the number of pole pairs of the motor 2, and the electric angular rotation speed ωe is integrated.

Further, the actual d-axis current id and the actual q-axis current iq can be obtained from currents other than the V-phase detection current iv and the W-phase detection current iw. At least two of three phase currents iu, iv, and iw actually flowing through the motor 2 are detected, and coordinate conversion is performed from the three phase coordinate system to the d-q coordinate system for a result of the detection, so that the actual d-axis current id and the actual q-axis current iq can be calculated.

In general motor control, the d axis and the q axis can be controlled independently by performing appropriate decoupling. For this reason, in the present embodiment, by performing decoupling and PI control in the current control unit 13, the three phase voltage command signals Vu*, Vv*, and Vw* can be calculated from the d-axis current command signal id* and the q-axis current command signal iq*.

Note that the interference state between the d-axis and the q-axis changes depending on the electric angular rotation speed ωe, and the calculation cost of the coordinate conversion performed between the d-q coordinate system and the three phase coordinate system is extremely high. Accordingly, among the functional blocks included in the inverter control device 10, the calculation load on the current control unit 13 is relatively large. Therefore, the processing time of the current control unit 13 is the main factor that determines the control period of the inverter control device 10.

The sampling period conversion unit 14 generates three phase voltage command signals Vu, Vv, and Vw** after update at every predetermined update period different from the calculation period T0 of the current control unit 13 based on the calculation result of the three phase voltage command signals Vu*, Vv*, and Vw* by the current control unit 13, and outputs the generated signals to the gate signal generation unit 15. At this time, for example, the sampling period conversion unit 14 generates the three phase voltage command signals Vu, Vv, and Vw** updated at an update period T1 shorter than the calculation period T0 from the three phase voltage command signals Vu*, Vv*, and Vw* generated at every calculation period T0 by the current control unit 13. Note that the details of the processing in the sampling period conversion unit 14 will be described later.

The gate signal generation unit 15 generates a gate signal for switching-driving a plurality of switching elements included in the three phase bridge circuit 17 based on the three phase voltage command signals Vu, Vv, and Vw after update output from the sampling period conversion unit 14. The gate signal generation unit 15 converts the three phase voltage command signals Vu, Vv, and Vw into a gate signal corresponding to each switching element by using, for example, a well-known method called complementary PWM. Note that, since the calculation processing for generating the gate signal causes a too large load for software to perform, the gate signal generation unit 15 is preferably realized by peripheral hardware with a built-in microcomputer, an FPGA, or the like. In this manner, the calculation processing time of the gate signal generation unit 15 can be significantly shortened, and the gate signal generation unit 15 can be operated independently of the current control unit 13 and the like realized by software of a microcomputer.

Therefore, the processing of the gate signal generation unit 15 hardly affects the calculation load on the inverter control device 10.

The gate signal generated by the gate signal generation unit 15 is output from the inverter control device 10 to the gate driver 16 in the inverter device 1. The gate driver 16 drives the three phase bridge circuit 17 by converting the input gate signal into a predetermined electric signal and outputting the signal to each switching element of the three phase bridge circuit 17. The switching element is configured using semiconductor elements such as Si, SiC, GaN, and the like, and the gate driver 16 converts the gate signal into an electric signal corresponding to these semiconductor elements and outputs the signal.

The three phase bridge circuit 17 is composed of a plurality of switching elements.

Each of the switching elements of the three phase bridge circuit 17 is switching-driven by being turned on or off according to an electric signal input from the gate driver 16. By the switching-driving of each of the switching elements, DC power supplied from the DC power supply 3 is converted into three phase AC power and output to each phase of the motor 2. A smoothing capacitor 18 is connected between the three phase bridge circuit 17 and the DC power supply 3. The smoothing capacitor 18 is provided for the purpose of compensating for power supply delay of the DC power supply 3 due to wiring inductance and the like, and generally, the higher the switching frequency, the smaller the capacity of the smoothing capacitor 18 can be made. Further, since the improvement in the switching frequency also leads to the improvement in time resolution of control, the torque ripple of the motor 2 is also expected to be reduced. For the above reasons, it is required to improve the switching frequency.

The current sensors 19a and 19b detect a phase current of the motor 2 and output a result of the detection to the A/D conversion unit 21 in the inverter control device 10. In the example of FIG. 1, of the three phase currents iu, iv, and iw flowing through the motor 2, the V-phase detection current iv and the W-phase detection current iw are detected by the current sensors 19a and 19b, respectively. The A/D conversion unit 21 acquires the detected currents iv and iw by the current sensors 19a and 19b at a constant sampling period, converts them into a data format that can be used in a microcomputer, and outputs them to the current control unit 13. The speed calculation unit 22 takes in the mechanical rotation angle θm output from the rotation angle sensor 20 and converts the angle θm into the mechanical angular rotation speed ωm of the motor 2.

Figure 2:
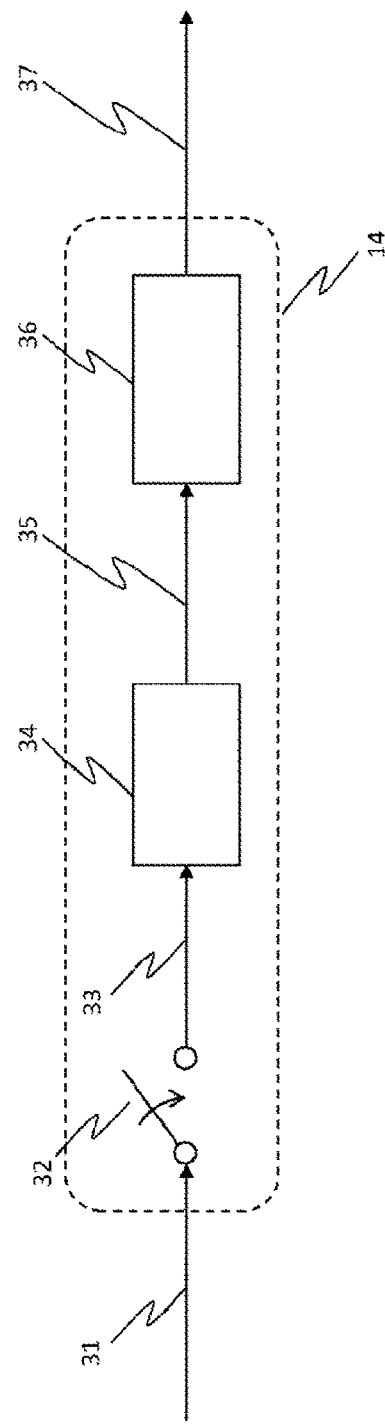
FIG. 2 is a basic configuration diagram of a sampling period conversion unit.

Next, details of the sampling period conversion unit 14 will be described with reference to FIGS. 2 and 3. FIG. 2 is a basic configuration diagram of the sampling period conversion unit 14. FIG. 3 is a diagram illustrating the output of each element in the sampling period conversion unit 14. Note that FIG. 3 shows an output example in a case where the update period T1 of the sampling period conversion unit 14 is half the calculation period T0 of the current control unit 13.

As shown in FIG. 2, the sampling period conversion unit 14 receives input of the three phase voltage command signals Vu*, Vv*, Vw* as a source signal 31. Note that the inverter control device 10 may be provided with three of the sampling period conversion units 14 having the configuration as shown in FIG. 2, and the three phase voltage command signals Vu*, Vv*, and Vw* may be separately supplied as the source signal 31 to the three sampling period conversion units 14. Alternatively, the three phase voltage command signals Vu*, Vv*, and Vw* may be collectively input as the source signal 31 to one of the sampling period conversion unit 14. In that case, the sampling period conversion unit 14 performs processing described below for each of the three phase voltage command signals Vu*, Vv*, and Vw*.

In the sampling period conversion unit 14, the input source signal 31 is converted into an impulse train 33 by a sampler 32. The sampler 32 samples the source signal 31 at the same sampling period T0 as the calculation period T0 of the current control unit 13 to generate the impulse train 33 which is a discrete value for each sampling period T0. FIG. 3(a) shows an example of the source signal 31 and the impulse train 33. Each value of the impulse train 33 indicated by a black circle in FIG. 3(a) is obtained by sampling the source signal 31 which is a continuous value as shown by a broken line at every sampling period T (T=T0). However, in practice, the three phase voltage command signals Vu*, Vv*, and Vw* input as the source signal 31 to the sampling period conversion unit 14 are calculated at each calculation period T0 in the current control unit 13 as described above. Therefore, the impulse train 33 which is a discrete value for each sampling period T0 can be generated also by taking in the three phase voltage command signals Vu*, Vv*, and Vw* directly as the impulse train 33.

Returning to the description of FIG. 2, the impulse train 33 generated for each sampling period T0 based on the source signal 31 is input to a zero adder 34. The zero adder 34 interpolates the impulse train 33 by adding a zero value to the impulse train 33, and generates a zero-added impulse train 35 corresponding to the update period T1. FIG. 3(b) shows an example of the zero-added impulse train 35. The value indicated by a white circle in FIG. 3(b) indicates a zero value added by the zero adder 34, and is added between values of the impulse train 33 indicated by the black circle. A combination of the white circles and the black circles in FIG. 3(b) represents the zero-added impulse train 35. Note that the calculation of the zero adder 34 is repeatedly executed at the update period T1 shorter than the above-described sampling period T0.

In the present embodiment, as described above, the update period T1 is half the sampling period T0, that is, the calculation period T0 of the current control unit 13. Therefore, the zero adder 34 is operated at a frequency twice as high as the input frequency of the impulse train 33. That is, when the impulse train 33 is input to the zero adder 34, a value of the impulse train 33 is directly output from the zero adder 34, and when the impulse train 33 is not input to the zero adder 34, the zero adder 34 outputs a zero value. As the zero adder 34 alternately performs such operations, the zero-added impulse train 35 corresponding to the update period T1 is generated.

The zero-added impulse train 35 generated by the zero adder 34 is input to a low-pass filter 36. The low-pass filter 36 converts the zero-added impulse train 35 into an upsampled signal 37 by removing a high frequency component of the zero-added impulse train 35. FIG. 3(c) shows an example of the upsampled signal 37. In FIG. 3(c), the zero value indicated by the white circle in FIG. 3(b) changes according to the magnitude of the values of the black circles before and after. In this manner, the upsampled signal 37 for each update period T1=T0/2 in which the middle of the impulse train 33 is interpolated is obtained from the impulse train 33 for each sampling period T0 shown in FIG. 3(a).

The sampling period conversion unit 14 outputs the upsampled signal 37 obtained from the three phase voltage command signal Vu*, Vv*, and Vw* as described above as the three phase voltage command signal Vu, Vv, and Vw after update to the gate signal generation unit 15. Therefore, the sampling period conversion unit 14 can output the three phase voltage command signals Vu, Vv, and Vw after update for each update period T1=T0/2.

Figure 4:
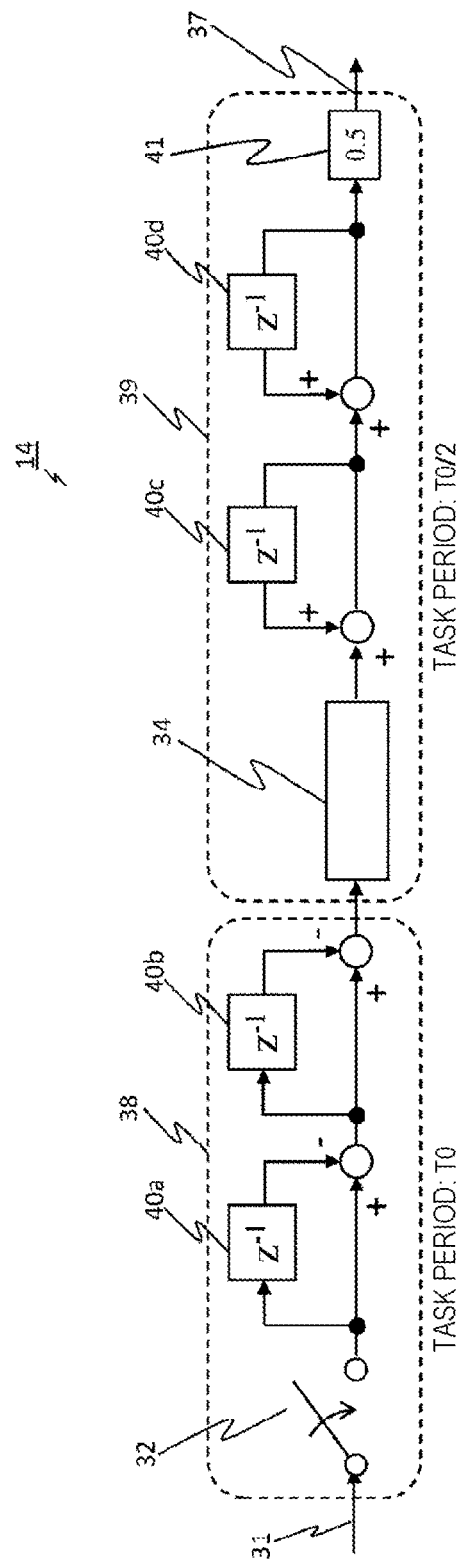
FIG. 4 is a detailed configuration diagram of the sampling period conversion unit.

FIG. 4 is a detailed configuration diagram of the sampling period conversion unit 14 in a case where the sampling period conversion unit 14 of FIG. 2 is realized by using a digital filter. In FIG. 4, primary processing 38 is disposed in a preceding stage of the zero adder 34, and secondary processing 39 including the zero adder 34 is disposed in a subsequent stage of the primary processing 38. A task period of the primary processing 38 is the same as the sampling period T0 described in FIG. 2, and is equal to the calculation period T0 of the current control unit 13. On the other hand, a task period of the secondary processing 39 is the same as the update period T1 described in FIG. 2, and is shorter than the task period of the primary processing 38. As described above, in a case where the update period T1 is half the calculation period T0, the task period of the secondary processing 39 is half the task period of the primary processing 38. That is, the sampling period conversion unit 14 shown in FIG. 4 is realized by the primary processing 38 in the previous stage executed at each task period T0 and the secondary processing 39 in the subsequent stage executed at each task period T1=T0/2.

The primary processing 38 includes the sampler 32 and previous value elements 40a and 40b which constitute a differentiation element. Since the primary processing 38 is executed at each task period T0, when a current time is t0, the previous value elements 40a and 40b in the primary processing 38 output a value of the source signal 31 at t0−T0 as a previous value. In the primary processing 38, a differentiator with the previous value elements 40a and 40b as a differentiation element executes differential operation based on the three phase voltage command signals Vu*, Vv*, and Vw* input as the source signal 31 at each task period T0, that is, at each calculation period T0 of the current control unit 13.

The secondary processing 39 includes the zero adder 34, previous value elements 40c and 40d constituting an integrator, and an adjustment gain 41. Since the secondary processing 39 is executed at each task period T1=T0/2, the zero adder 34 in the secondary processing 39 adds a zero value at each task period T1, that is, at each update period T1 to the impulse train 33 that is applied with the differential operation by the differentiator in the primary processing 38 to generate the zero-added impulse train 35. Further, when the current time is t0, the previous value elements 40c and 40c1 in the secondary processing 39 output a value of the zero-added impulse train 35 at t0−T1 as a previous value. In the secondary processing 39, the integrator having the previous value elements 40c and 40d as an integral element executes integral operation based on t zero-added impulse train 35 at each task period T1, that is, at each update period T1. Note that these integrators correspond to the low-pass filter 36 in FIG. 2. The adjustment gain 41 multiplies the output from the integrator by a predetermined adjustment gain (for example, 0.5) to adjust a gain reduced by the differential operation and the integral operation described above to the same level as the source signal 31.

According to the configuration of the sampling period conversion unit 14 shown in FIG. 4, the primary processing 38 and the secondary processing 39 can be easily realized digitally. For example, the primary processing 38 can be implemented by program processing of a microcomputer, and the secondary processing 39 can be implemented by an FPGA. Therefore, the inverter control device 10 can be configured even by using a microcomputer having no PWM function. Furthermore, by using a microcomputer for the processing of the current control unit 13 in a dedicated manner, the processing time of the entire inverter control device 10 can be reduced, which contributes to the shortening of the control period.

Figure 5:
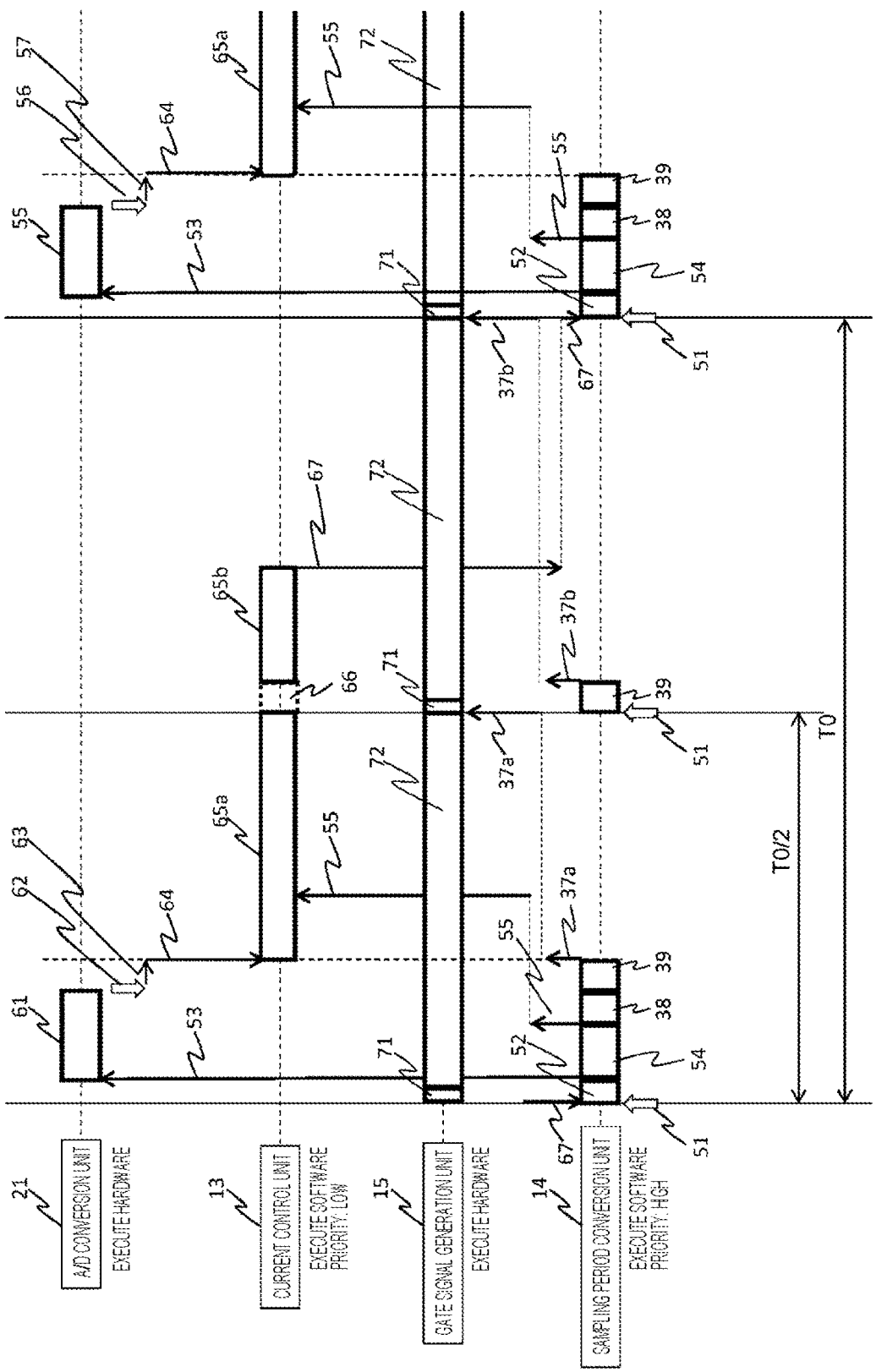
FIG. 5 is a diagram showing an example of a time chart of each processing in the inverter control device according to the embodiment of the present invention.

FIG. 5 is a diagram showing an example of a time chart of each processing in the inverter control device 10 according to the embodiment of the present invention. Like FIG. 2 and FIG. 3, FIG. 5 shows an example of a case in which the update period T1 of the sampling period conversion unit 14 is half the calculation period T0 of the current control unit 13, that is, T1=T0/2. Further, in FIG. 5, the processing executed by the A/D conversion unit 21, the current control unit 13, the gate signal generation unit 15, and the sampling period conversion unit 14 in the inverter control device 10 is shown in units of tasks.

In the inverter control device 10 of the present embodiment, as shown in FIG. 5, the A/D conversion unit 21 and the gate signal generation unit 15 are realized by separate pieces of hardware, and the current control unit 13 and the sampling period conversion unit 14 are realized by software executed by a microcomputer. Therefore, t current control unit 13, the sampling period conversion unit 14, and the current control unit 13 or the sampling period conversion unit 14 can operate in parallel with each other. On the other hand, the current control unit 13 and the sampling period conversion unit 14 which are executed by the same microcomputer cannot be operated at the same time. Therefore, in the present embodiment, a task of the sampling period conversion unit 14 is preferentially executed by setting the priority of the sampling period conversion unit 14 higher than that of the current control unit 13.

In the microcomputer, a timer interrupt 51 is generated at each update period T1 of the sampling period conversion unit 14, that is, at each half time of the calculation period T0 of the current control unit 13. When the timer interrupt 51 is generated, the microcomputer operates as the sampling period conversion unit 14 and executes first time processing of the sampling period conversion unit 14. In the first time processing, the sampling period conversion unit 14 performs A/D setting processing 52 for acquiring a voltage command 67 described later from a memory (not shown) in the microcomputer and operating the A/D conversion unit 21. After performing the A/D setting processing 52, the sampling period conversion unit 14 generates an A/D conversion execution trigger 53 to activate the A/D conversion unit 21, and then performs speed/angle calculation 54. In the speed/angle calculation 54, the sampling period conversion unit 14 acquires the mechanical rotation angle θm of the motor 2 output from the rotation angle sensor 20 of FIG. 1, and performs calculation of the electric angular rotation speed ωe and the electric rotation angle θe used in the current control unit 13. The electric angular rotation speed ωe and the electric rotation angle θe obtained in the speed/angle calculation 54 are output from the sampling period conversion unit 14 as speed/angle data 55 and stored in a memory.

After that, the sampling period conversion unit 14 sequentially executes the primary processing 38 and the secondary processing 39 described in FIG. 4. After performing the secondary processing 39, the sampling period conversion unit 14 outputs the obtained upsampled signal 37 as a first time upsampled signal 37a and stores the upsampled signal 37a in a memory of the microcomputer.

While the microcomputer is executing the first time processing of the sampling period conversion unit 14 described above, the A/D conversion unit 21 performs the A/D conversion processing 61 in parallel with the first time processing. In the A/D conversion processing 61, the A/D conversion unit 21 acquires information on the V-phase detection current iv and the W-phase detection current iw output from the current sensors 19a and 19b of FIG. 1, respectively. After performing the A/D conversion processing 61, the A/D conversion unit 21 generates a software interrupt signal 62 for activating the current control unit 13.

Assume that the first time processing of the sampling period conversion unit 14 has not been finished yet in the microcomputer when the software interrupt signal 62 is generated in the A/D conversion unit 21. In this case, due to the effect of the above-described priority, the first time processing of the sampling period conversion unit 14 is performed preferentially in the microcomputer, and the processing of the current control unit 13 is kept waiting during end waiting time 63 until the end of the first time processing. When the first time processing of the sampling period conversion unit 14 is finished, the microcomputer operates as the current control unit 13 and executes a first half 65a of the current control calculation. In the first half 65a of this current control calculation, the current control unit 13 acquires current information 64 from the A/D conversion unit 21 and also acquires the speed/angle data 55 stored in a memory, and uses these pieces of information to start calculation of the three phase voltage command signals Vu*, Vv*, and Vw* corresponding to the desired torque τ*.

Here, assume that execution time of the entire current control calculation in the current control unit 13 is longer than a generation period of the timer interrupt 51, that is, T1=T0/2. In this case, in the microcomputer, the sampling period conversion unit 14 is activated in response to the timer interrupt 51 during execution of the current control calculation, and second time processing of the sampling period conversion unit 14 is started. That is, due to the effect of the above-described priority, the second time processing of the sampling period conversion unit 14 is performed preferentially even during the execution of the current control calculation by the current control unit 13 in the microcomputer, and the processing of the current control unit 13 is kept waiting during end waiting time 66 until the end of the second time processing.

In the second time processing of the sampling period conversion unit 14, the sampling period conversion unit 14 executes only the secondary processing 39. After performing the secondary processing 39, the sampling period conversion unit 14 outputs the obtained upsampled signal 37 as a second time upsampled signal 37b and stores the upsampled signal 37b in a memory of the microcomputer.

Further, in response to the timer interrupt 51, the gate signal generation unit 15 acquires, from the memory, the first time upsampled signal 37a obtained in the first time processing of the sampling period conversion unit 14, and, based on the upsampled signal 37a, executes data update processing 71 for updating data used for generating a gate signal to be output to the gate driver 16. After that, t gate signal generation unit 15 executes PWM output processing 72 based on the updated data to generate a gate signal corresponding to the first time upsampled signal 37a and output the gate signal to the gate driver 16.

When the second time processing of the sampling period conversion unit 14 is finished, the microcomputer resumes operation of the current control unit 13 and executes a second half 65b of the current control calculation. When the current control calculation is finished, the current control unit 13 stores the obtained voltage command 67 in the memory of the microcomputer.

After that, in the microcomputer, the sampling period conversion unit 14 is activated again in response to the next timer interrupt 51, so that the first time processing of the sampling period conversion unit 14 is executed as described above. At this time, the sampling period conversion unit 14 acquires the voltage command 67 stored in the memory by the second half 65b of the current control calculation. Further, in response to the next timer interrupt 51, the gate signal generation unit 15 acquires, from the memory, the second time upsampled signal 37b obtained in the second time processing of the sampling period conversion unit 14, and, based on the upsampled signal 37b, executes the data update processing 71 for updating data used for generating a gate signal to be output to the gate driver 16. After that, the gate signal generation unit 15 executes the PWM output processing 72 based on the updated data to generate a gate signal corresponding to the second time upsampled signal 37b and output the gate signal to the gate driver 16.

In the inverter control device 10, the processing of the A/D conversion unit 21, the current control unit 13, the gate signal generation unit 15, and the sampling period conversion unit 14 is executed according to the procedure described above. In this manner, the gate signal generation unit 15 can generate a gate signal that is updated at each update period T1 that is half the calculation period T0 of the current control unit 13 and output the gate signal to the gate driver 16.

In the above description of FIG. 5, for convenience of explanation, the current control calculation performed by the current control unit 13 is divided into the first half 65a and the second half 65b, which are generated as a series of current control calculations are forcibly divided by the timer interrupt 51. For this reason, a program for the microcomputer to execute these is not coded separately for the first half 65a and the second half 65b in advance. Therefore, the current control unit 13 can use a program that is exactly the same as one used in a case where the sampling period conversion unit 14 is not used. Accordingly, a designer does not need to modify the program of the current control unit 13 as the sampling period conversion unit 14 is implemented. In this manner, in a case where the inverter control device 10 of the present embodiment is introduced, it is possible to suppress the generation of extra man-hours during development, which contributes to cost reduction.

Further, as described in FIG. 4, the sampling period conversion unit 14 can be realized by using a simple digital filter. For this reason, by introducing the inverter control device 10 of the present embodiment, a control period of the inverter device 1 can be easily halved and the output frequency can be doubled as compared with a conventional inverter.

Note that FIG. 5 shows the configuration in which the data used for generating a gate signal is updated in synchronization with the timer interrupt 51 in order to make the update timings of the gate signal output at equal intervals. However, in order to reflect an update result to the gate signal output as soon as possible, the configuration may be such that the obtained upsampled signals 37a and 37b are reflected to the data of the gate signal generation unit 15 immediately after the processing of the sampling period conversion unit 14 is finished. In this case, since the first time processing time of the sampling period conversion unit 14 and the second time processing time of the sampling period conversion unit 14 are different, the update timings of the gate signal output are not at equal intervals. In view of the above, appropriate time delay processing may be provided after the second time processing of the sampling period conversion unit 14, so that the update timings of the gate signal output are at equal intervals.

Figure 6:
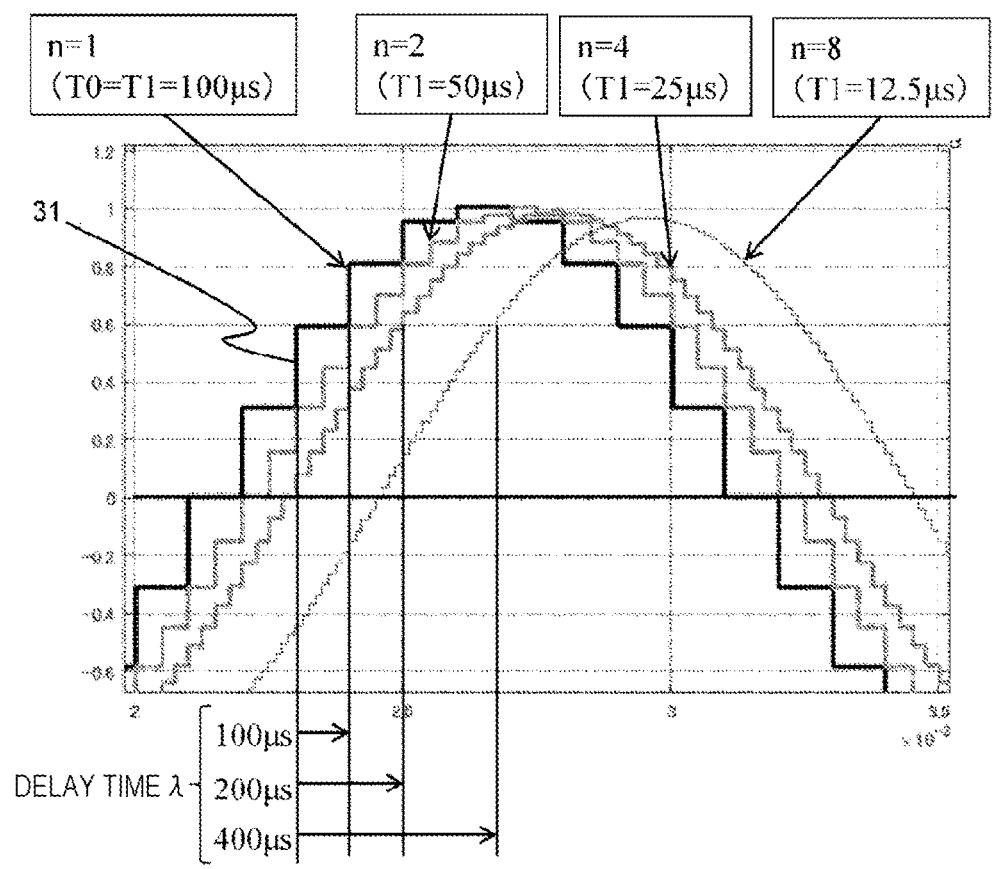
FIG. 6 is a diagram showing a state of a change in gate signal output when a ratio of an update period of the sampling period conversion unit to a calculation period of the current control unit is changed.

Next, a relationship between a ratio of the update period T1 of the sampling period conversion unit 14 to the calculation period T0 of the current control unit 13 and the gate signal output will be described. FIG. 6 is a diagram showing a state of a change in the gate signal output when the ratio of the update period T1 of the sampling period conversion unit 14 to the calculation period T0 of the current control unit 13 is changed. FIG. 6 shows an example of the gate signal output in a case where the calculation period T0 of the current control unit 13 is set to T0=100 μs and a frequency magnification n by the sampling period conversion unit 14 is changed to n=1, 2, 4, and 8. Note that the frequency magnification n is a value defined as n=T0/T1 using the calculation period T0 and the update period T1.

In FIG. 6, the signal delay in the gate signal output increases as the frequency magnification n increases. Here, assume that the delay time with respect to the gate signal output when n=1 is λ, the delay time λ when n=2, 4, and 8 is expressed by following Equation (1):

$$\lambda = T0 \times n/2 \quad (1)$$

Figure 7:
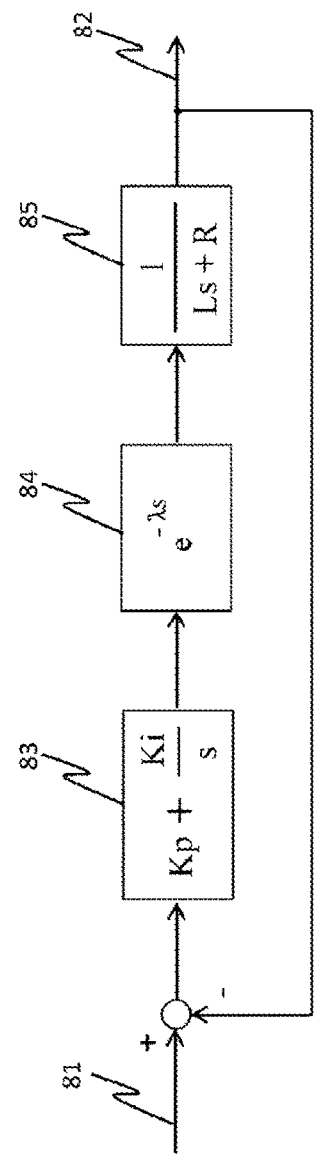
FIG. 7 is a block diagram of a current control system showing, in a simplified manner, processing of the current control unit and the sampling period conversion unit in the inverter control device according to the embodiment of the present invention.

Next, application conditions for the calculation period T0 of the current control unit 13 and the update period T1 of the sampling period conversion unit 14 will be described. FIG. 7 is a block diagram of a current control system showing, in a simplified manner, processing of the current control unit 13 and the sampling period conversion unit 14 in the inverter control device 10 according to the embodiment of the present invention. Note that, in FIG. 7, for simplification of the description, the description of the coordinate conversion between the d-q coordinate system and the three phase coordinate system and the conversion from a current value to a voltage value is omitted.

In FIG. 7, a current command signal 81 is input to t current control system. Specifically, the current command signal 81 corresponds to the d-axis current command signal id* and the q-axis current command signal iq* output from the current command generation unit 12 and input to the current control unit 13. In PI control 83, a difference between the input current command signal 81 and a detection value of an output current signal 82 is controlled to be zero. In the PI control 83 shown in FIG. 7, Kp is a proportional gain, Ki is an integral gain, and s is a Laplace operator.

A control result of the PI control 83 is input to an electric system plant model 85 via a delay element 84. The delay element 84 is a model of the delay time λ described above generated in the sampling period conversion unit 14. The electric system plant model 85 represents a relationship between a voltage and a current on the d axis and the q axis after decoupling, and can be expressed as a primary delay element defined by an inductance component L and a resistance component R. The output current signal 82 is obtained by the electric system plant model 85.

Here, the delay time λ of the delay element 84 affects the stability of the current control system.

For this reason, in the inverter control device 10 of the present embodiment, a necessary condition for defining an application limit of the sampling period conversion unit 14 can be calculated from a stable condition of the current control system shown in FIG. 7.

For example, the proportional gain Kp and the integral gain Ki of the PI control 83 are determined so that the entire current control system of FIG. 7 becomes a primary system. In this way, when the delay time λ is zero, the current control system is always stable over the entire frequency domain. Accordingly, the system is characterized by being more robust against delay than other control systems. That is, the stability condition of the current control system in FIG. 7 in this case is considered to correspond to a limit value by which stability can be ensured in a general control system.

Under the above conditions, when a cutoff frequency of the current control unit 13 is ωc, the proportional gain Kp and the integral gain Ki can be determined by following Equations (2) and (3) using the inductance component L and the resistance component R of the electric system plant model 85:

$$Kp = L \times \omega c \quad (2)$$

$$Ki = Kp \times R/L \quad (3)$$

FIG. 8 is a diagram showing an example of a Bode plot of the current control system (open loop) shown in FIG. 7. By employing a highly stable primary system as the control system as described above, a gain shape of the Bode plot becomes a straight line having a slope of −20 dB/dec as shown in FIG. 8. On the other hand, the phase falls within the range of −90° to −180° in the case of the primary system. However, in the present control system, the phase delay further progresses beyond −180° due to the effect of the delay time λ. The phase margin at this time is determined by a magnitude relationship between the delay time λ and the cutoff frequency ωc, and a positive phase margin results in a stable system, and a negative phase margin results in an unstable system. In the Bode plot of FIG. 8, (a) shows a stable case, and (b) shows an unstable case. Specifically, when the cutoff frequency ωc (=Kp/L) satisfies the condition of Expression (4) described below, the current control system in FIG. 7 becomes stable. That is, the stability condition of the current control system shown in FIG. 7 is expressed by Equation (4) described below. In Equation (4), π is the circular constant.

$$\omega c = Kp/L < \pi/(2\lambda) \quad (4)$$

The following Conditional expression (5) is obtained from the above Equation (1) and the above Equation (4):

$$n < \pi/(T0 \times \omega c) \quad (5)$$

Further, since the update period T1 of the sampling period conversion unit 14 needs to be smaller than the calculation period T0 of the current control unit 13 and n=T0/T1, the condition of n>1 needs to be satisfied. Therefore, from this and the above Conditional expression (5), the following Conditional expression (6) is derived as the application condition of the calculation period T0 of the current control unit 13 and the update period T1 of the sampling period conversion unit 14:

$$1 < T0/T1 < \pi/(T0 \times \omega c) \quad (6)$$

As described above, the above Conditional expression (6) is established between the calculation period T0 and the cutoff frequency ωc of the current control unit 13 and the update period T1 of the sampling period conversion unit 14. In this manner, the current control system can be stabilized in the inverter control device 10, so that the control of the inverter device 1 can be prevented from diverging.

According to the embodiment of the present invention described above, an action and an effect described below are achieved.

(1) The inverter control device 10 is a device for controlling the inverter device 1 having a plurality of switching elements. The inverter control device 10 includes the current control unit 13 that calculates the three phase voltage command signals Vu*, Vv*, and Vw* based on the d-axis current command signal id* and the q-axis current command signal iq* at each predetermined calculation period T0, the sampling period conversion unit 14 that outputs the three phase voltage command signals Vu, Vv, and Vw** after update at each predetermined update period T1 different from the calculation period T0 based on a calculation result of the three phase voltage command signals Vu*, Vv*, and Vw* by the current control unit 13, and the gate signal generation unit 15 that generates a gate signal for switching-driving a plurality of the switching elements based on the three phase voltage command signals Vu, Vv, and Vw after update output from the sampling period conversion unit 14. In the above manner, the three phase voltage command signals Vu, Vv, and Vw after update input to the gate signal generation unit 15 can be updated at high speed without using a high-performance microcomputer capable of high-speed calculation. For this reason, it is possible to improve control characteristics of an inverter while suppressing manufacturing cost.

(2) In the inverter control device 10, the update period T1 is shorter than the calculation period T0. For this reason, the update period of the three phase voltage command signals Vu, Vv, and Vw** after update input to the gate signal generation unit 15 can be made shorter than the three phase voltage command signals Vu*, Vv*, and Vw* calculated by the current control unit 13. Therefore, improvement in the control characteristics can be achieved.

(3) The sampling period conversion unit 14 includes the zero adder 34 that adds a zero value to the impulse train 33 which is a calculation result of the three phase voltage command signals Vu*, Vv*, and Vw* to generate the zero-added impulse train 35 corresponding to the update period T1, and the low-pass filter 36 that converts the zero-added impulse train 35 to the upsampled signal 37 which is the three phase voltage command signals Vu, Vv, and Vw** after update. In this manner, the sampling period conversion unit 14 in which the update period T1 is made shorter than the calculation period T0 can be realized.

(4) The sampling period conversion unit 14 further includes the differentiator that executes differential operation based on the impulse train 33 that is a calculation result of the three phase voltage command signals Vu*, Vv*, and Vw* for each calculation period T0 in the primary processing 38. Further, in the secondary processing 39, the zero adder 34 adds a zero value to the impulse train 33 applied with the differential operation by the differentiator in the primary processing 38 at each update period T1 to generate the zero-added impulse train 35. The low-pass filter 36 includes the integrator that executes the integral operation based on the zero-added impulse train 35 at each update period T1. In this manner, the sampling period conversion unit 14 in which the update period T1 is made shorter than the calculation period T0 can be realized easily by a digital filter.

(5) When the cutoff frequency of the current control unit 13 is ωc and the circular constant is π, the calculation period T0 and the update period T1 preferably satisfy Conditional expression (6) described above. In this manner, the divergence of inverter control can be prevented.

Note that the embodiments and various variations described above are merely examples, and the present invention is not limited to the content of these examples unless the characteristics of the invention are impaired. Further, although various embodiments and variations have been described above, the present invention is not limited to the content of these embodiments and variations. Other modes considered within the scope of the technical idea of the present invention are also included in the scope of the present invention.

REFERENCE SIGNS LIST 1 inverter device
2 motor 3: DC power supply
10 inverter control device
11 torque command
12 current command generation unit
13 current control unit
14 sampling period conversion unit
15 gate signal generation unit
16 gate driver
17 three phase bridge circuit
18 smoothing capacitor
19a, 19b current sensor
20 rotation angle sensor
21 A/D conversion unit
22 speed calculation unit

The invention claimed is:

1. An inverter control device configured to control an inverter having a plurality of switching elements, the inverter control device comprising:
  a current controller configured to calculate a voltage command based on a current command at each predetermined calculation period;
  a sampling period converter configured to output a voltage command signal at each predetermined update period different from the calculation period based on a calculation result of the voltage command by the current controller; and
  a gate signal generator configured to generate a gate signal for switching-driving the plurality of switching elements based on the voltage command signal output from the sampling period converter,
  wherein the update period is shorter than the calculation period, and
  wherein the sampling period converter includes a zero adder configured to add a zero value to a calculation result of the voltage command to generate a zero-added impulse train corresponding to the update period, and a low-pass filter configured to convert the zero-added impulse train to the voltage command signal.

2. The inverter control device according to claim 1, wherein
  the sampling period convertor further includes a differentiator configured to execute differential operation based on a calculation result of the voltage command for each of the calculation periods,
  the zero adder is configured to add, at each of the update periods, the zero value to a calculation result of the voltage command applied with differential operation by the differentiator to generate the zero-added impulse train, and
  the low-pass filter includes an integrator configured to execute integral operation based on the zero-added impulse train at each of the update periods.

3. The inverter control device according to claim 1, wherein
  when the calculation period is T0, the update period is T1, a cutoff frequency of the current controller is ωc, and a circular constant is π, the calculation period and the update period satisfy following conditional expression:

$1 < T0/T1 < \pi/(T0 \times \omega c)$.

4. An inverter control method for controlling an inverter having a plurality of switching elements, the inverter control method comprising:
  calculating a voltage command based on a current command at each predetermined calculation period by a computer;
  outputting a voltage command signal at each predetermined update period different from the calculation period based on a calculation result of the voltage command by the computer, and generating a gate signal for switching-driving the plurality of switching elements based on the voltage command signal output from the computer, the update period being shorter than the calculation period; and
  adding a zero value to a calculation result of the voltage command to generate a zero-added impulse train corresponding to the update period, and converting, via a low-pass filter, the zero-added impulse train to the voltage command signal.

5. A non-transitory computer readable medium storing an inverter control program, which when executed by a computer, performs a method, the method comprising:
  controlling an inverter having a plurality of switching elements;
  calculating a voltage command based on a current command at each predetermined calculation period,
  outputting a voltage command signal for generating a gate signal for switching-driving the plurality of switching elements at each predetermined update period different from the calculation period based on a calculation result of the voltage command,
  the update period being shorter than the calculation period; and
  adding a zero value to a calculation result of the voltage command to generate a zero-added impulse train corresponding to the update period, and converting, via a low-pass filter, the zero-added impulse train to the voltage command signal.

* * * * *